W. J. INNIS.
Balanced Valve for Steam Engines.

No. 233,351. Patented Oct. 19, 1880.

Witnesses:
T. C. Brecht,
Charles F. Miller.

Inventor:
Wm. J. Innis,
by James C. Boyce,
Atty.

UNITED STATES PATENT OFFICE.

WILLIAM J. INNIS, OF OIL CITY, PENNSYLVANIA.

BALANCED VALVE FOR STEAM-ENGINES.

SPECIFICATION forming part of Letters Patent No. 233,351, dated October 19, 1880.

Application filed August 20, 1877.

*To all whom it may concern:*

Be it known that I, WILLIAM J. INNIS, of Oil City, in the county of Venango and State of Pennsylvania, have invented a new and useful Improvement in Balanced Valves for Steam-Engines, which is fully set forth and illustrated in this specification and the accompanying drawings.

The object of my invention is to produce a piston-valve for a steam-engine which shall be balanced, simple in construction, not liable to get out of order, and subject to but little wear.

The invention consists of a hollow piston with closed ends provided with suitable steam-ports.

It consists of four parts united by narrow tie-bars or bridges, the spaces between which form the ports.

Figure 1:
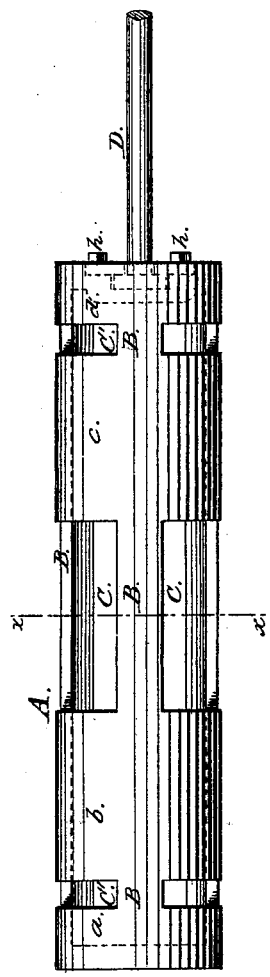
Figure 2:
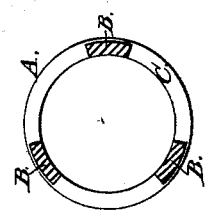
Figure 3:
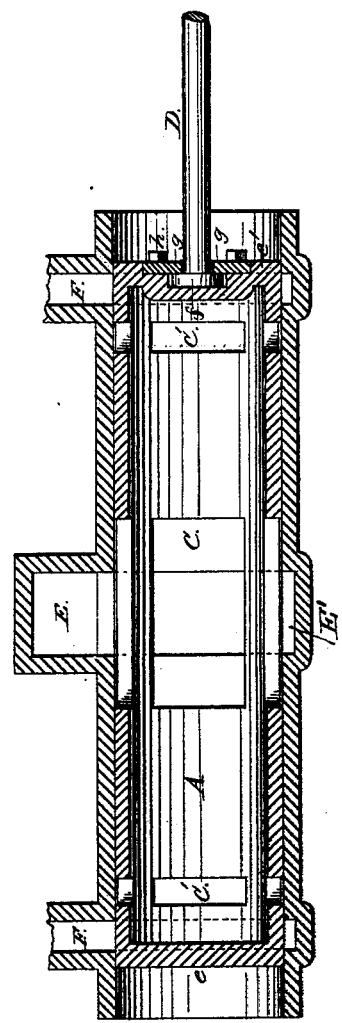

In the accompanying drawings, Figure 1 is a side view of the valve. Fig. 2 is a cross-section on the line $x$ $x$. Fig. 3 is a longitudinal section, showing the valve in its seat or steam-chest.

A represents the valve, consisting of four parts, $a$, $b$, $c$, and $d$, which are united by bridges B, and the spaces between which form the ports C and C' for the passage of the steam. This valve is generally made cylindrical, and when so formed the above construction is to permit the valve to rotate and still retain uniform passages for steam.

The ends or heads $e$ $e'$ are closed, the whole being cast in one piece. The ports can therefore never change their relative position.

The inner head, $e'$, is recessed to receive the round head $f$ of the stem D, which is held in its place by a flange or plate, $g$, secured by suitable bolts $h$.

It will be observed that the head $f$ is less in size than its receptacle, and the aperture in the plate $g$ is somewhat larger than the stem D; but the plate $g$ closely presses the head $f$ of the stem D to head $e'$ of the piston, so that in the movement of the valve there is no lost motion; but in case the stem D is not exactly in the center of its stuffing-box the head $f$ will adjust itself in the head $e'$ of the valve, so there will be no strain between the valve and its stem and no binding on either of them.

The steam is admitted through the pipe E, surrounding recess E', and through the central ports, into the interior of the piston, and then from the interior to the opposite ends of the main cylinder by the ports C' C' as they arrive opposite the induction-ports F. The steam is exhausted when the piston-valve has uncovered the ports F alternately.

By the construction of my valve in the shape and manner shown I secure a very great amount of wearing-surface in proportion to its weight.

I claim—

1. A balanced piston-valve, A, with closed ends, a series of longitudinal openings, C, in the center, and a series of transverse openings, C', at each end, arranged substantially as shown, and for the purpose described.

2. A balanced piston-valve, A, formed of the combination of four cylindrical parts, $a$ $b$ $c$ $d$, bridges B to unite said parts, a closed flat head, $e$, a recessed head, $f$, and a perforated cap, $g$, substantially as and for the purpose described.

3. The valve-stem D, provided with a head, $f$, in combination with a balanced piston-valve, A, having a recess for the head $f$ and aperture in the cap for the stem D, larger in their diameters than said head $f$ and stem D, substantially as shown, and for the purpose specified.

4. A hollow balanced piston-valve having closed ends, a series of longitudinal ports in the center, and a series of transverse ports adjoining each end, in combination with a valve-casing or steam-chest having annular recess in the center and adjoining each end, substantially as and for the purpose described.

WILLIAM J. INNIS.

Witnesses:
E. F. HOWELL,
JAMES C. BOYCE.